(No Model.) 2 Sheets—Sheet 1.

F. PRINZ.
SCREW CONVEYER.

No. 523,237. Patented July 17, 1894.

(No Model.)  2 Sheets—Sheet 2.

F. PRINZ.
SCREW CONVEYER.

No. 523,237. Patented July 17, 1894.

Witnesses  Inventor

UNITED STATES PATENT OFFICE.

FAUSTIN PRINZ, OF MILWAUKEE, WISCONSIN.

SCREW CONVEYER.

SPECIFICATION forming part of Letters Patent No. 523,237, dated July 17, 1894.

Application filed December 16, 1893. Serial No. 493,865. (No model.)

*To all whom it may concern:*

Be it known that I, FAUSTIN PRINZ, a subject of the Emperor of Germany, residing at Milwaukee, in the county of Milwaukee and State of Wisconsin, have invented certain new and useful Improvements in Screw Conveyers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to conveyer or directing flights, and it is particularly well adapted for use in feeding grain or other material in opposite directions to a separator or elsewhere as delivered from a hopper, and it has for its object to provide for the equal feed of the material in the opposite directions as received from the hopper whereby the feed is rendered regular and practically equal in opposite directions.

To the accomplishment of the foregoing objects and such objects as may hereinafter appear the invention consists in the construction and in the combination of parts hereinafter particularly described and then sought to be specifically defined by the claims, reference being had to the accompanying drawings, forming a part hereof, and in which—

Figure 1:
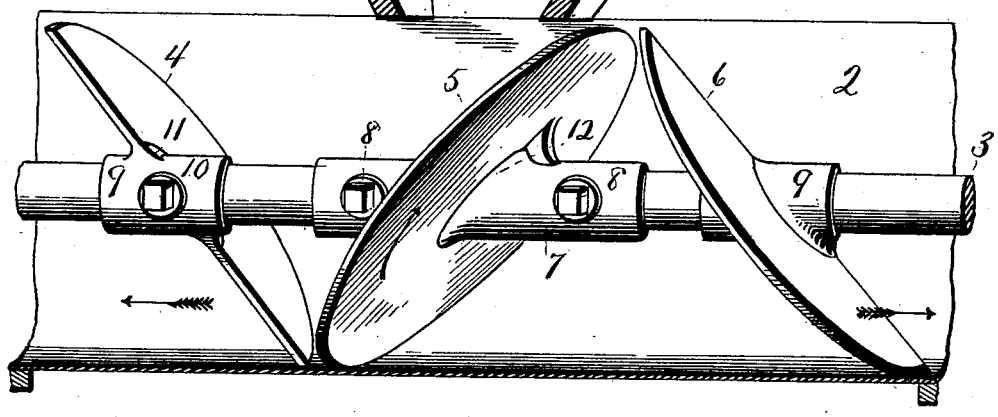
Figure 2:
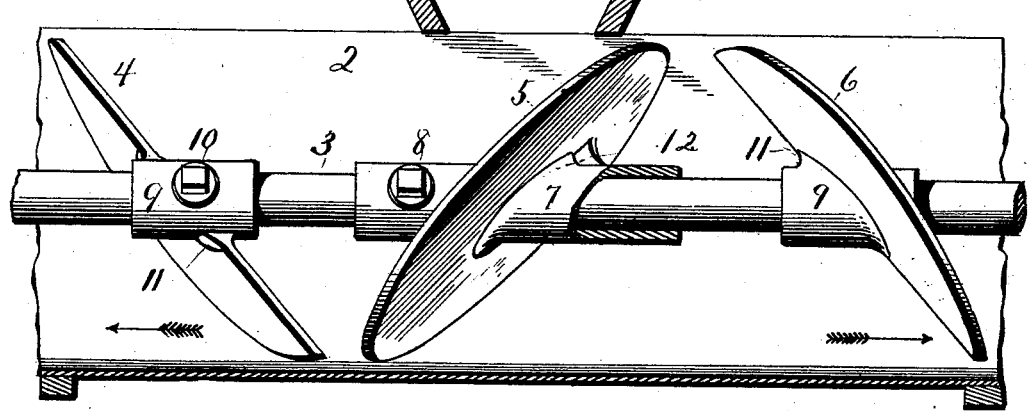
Figure 3:
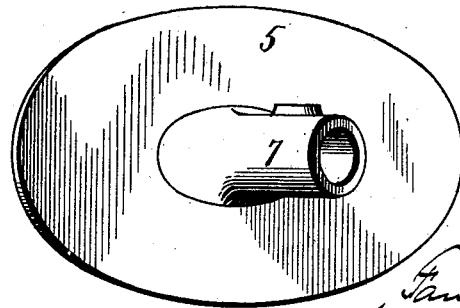
Figure 4:
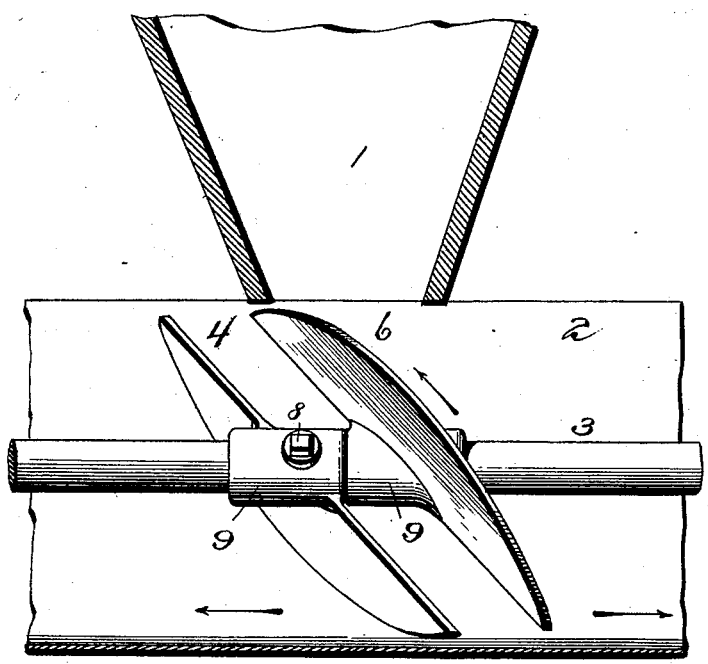
Figure 5:
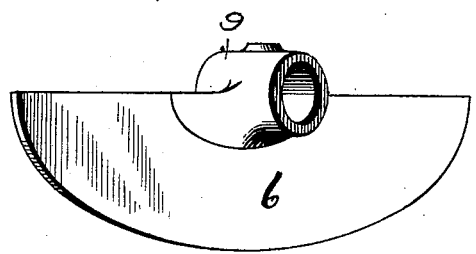

Figure 1 is a perspective of the feed hopper and conveyer trough with my improved flight in the trough, portions of the hopper and trough being omitted. Fig. 2 is a side view of the same with the shaft and flights slightly rotated. Fig. 3 is a face view of the elliptical flight. Fig. 4 is a side view showing the flight formed of two half ellipses, and Fig. 5 is a face view of one of the half elliptical flights.

In the drawings the numeral 1 designates a hopper receiving the grain or other material from its source and discharging it into a conveyer trough 2 of any desired length and having openings at opposite ends so that the material may be delivered therefrom at both ends to a separator if the device be used in a separating machine, or elsewhere.

Extending longitudinally through the conveyer trough is the conveyer flight shaft 3 upon which any desired number of flights will be mounted so as to feed the material into the trough in opposite directions as it is received from the feed hopper, there being three flights shown in the drawings as that number is sufficient to illustrate the invention. The flights are designated by numerals 4, 5 and 6. The central or intermediate flight 5 is elliptical in form with a central opening through the same and having a hub 7, preferably on both sides of the flight so that the conveyer shaft 3 may pass through the hub and central opening in the flight and the flight be secured to the shaft by set screws 8 passed through the hub so as to bear against the shaft. It is also preferred to form a rib 12 at the juncture of the flight and the hub so as to give increased strength at that point. It will be observed that the flight stands obliquely to its hub and the shaft 3.

To each side of the central or intermediate flight 5 there is arranged upon the shaft 3 any desired number of the flights 4 and 6. Each of these flights is in the form of a semi or half ellipse and each is formed with a hub 9 through which the shaft 3 passes, and through each hub passes a set screw 10 to secure the hub and its flight to the shaft 3. At the juncture of each of the flights and its hub is formed a ridge or rib 11 for the purpose of giving greater strength at that point. It will be observed that each of these semi or half elliptical flights stands obliquely to its hub and its shaft 3.

It will be observed that the half elliptical flight 4 extends from one side of the shaft 3 and that the half elliptical flight 6 extends from the opposite side of the same shaft and that the intermediate elliptical flight 5 extends from both sides of the shaft, the flight to the right of the central flight giving a right hand feed and the flight to the left a left hand feed while the central or intermediate flight constitutes the first flight of both a right and a left hand feed or screw conveyer.

It will of course be understood that there will be as many flights on both sides of the central or intermediate flight as will be necessary to feed the material the desired distance and that the flights will be so arranged as to serve to feed the material to the right on one side of the central or intermediate flight and to the left on the other side thereof.

It will also be observed that the intermediate or central flight 5 is so arranged in relation to the hopper 1 that when the flight 5 is in one position, for instance, in the position shown in Fig. 1 of the drawings the material discharged from the hopper will be by said flight directed to the left, while when the flight 5 is in its other position or the position to the reverse of that shown in Fig. 1, to which reverse position it is brought when the shaft 3 has made a half revolution, the material as delivered from the hopper will be directed by that flight to the right and conveyed to the right by the flights on that side of the central or intermediate flight. In this way I obtain a regular and equal feed of the material to the right and to the left so that it may be conducted in the two directions to the separator or separators if they be employed in connection with such a machine, or elsewhere according to the particular use made of the conveyer flight. This arrangement by which the central or intermediate flight is made to be the first flight of both a right and a left hand conveyer so as to direct the material to a conveyer flight feeding in one direction and then to a conveyer flight feeding in the opposite direction whereby an equal feed is obtained in both directions, I consider to be an important advance in the art and to possess material advantages over other conveyers or conveyer flights heretofore in use.

I consider the particular form of conveyer flights illustrated and described as the best form of embodiment of my invention and while I lay claim thereto I do not restrict myself to such form where the other features of the invention may be employed in other forms.

The principal or main feature of this invention is the obliquely set flight arranged under the feed hopper or spout so as to divide or split the material and direct it in equal quantities first to one side and then to the other side in the rotation of the flight. This enables me to get an equal feed of the material in opposite directions no matter how small or how large be the quantity of the material as it flows to the flight. This is an important feature of the invention, and the flight will operate in the manner described and direct the material in opposite directions whether the flights be used alone or in connection with additional means for further feeding the material as it is fed to one side or the other by said flight and therefore I do not confine myself to the employment of additional flights in connection with that flight as the said flight performs the function stated even though it be used alone. Nor do I confine myself to making this dividing or splitting flight in one piece for it is obvious that if the two half elliptical flights should be moved up to each other so as to bring them as close together as their construction will permit as illustrated in Fig. 4 the same function of splitting or dividing the feed will be obtained in substantially the same way although perhaps not quite as efficiently as when the flight is made in one piece.

Having described my invention and set forth its merits, what I claim is—

1. In a conveyer, series of flights arranged to feed the material in opposite directions, and an intermediate flight arranged to constitute the first flight of both a right hand and a left hand conveyer, substantially as and for the purposes described.

2. In a conveyer, series of flights arranged to feed the material in opposite directions, and an intermediate flight obliquely arranged to direct the material first to one side to the flights feeding in one direction and then to the other side to the flights feeding in the opposite direction, substantially as and for the purposes described.

3. In a conveyer, series of flights arranged to feed the material in opposite directions, a feed hopper to deliver the material to the conveyer flights, and a flight intermediate of the oppositely conveying flights and arranged in relation to the hopper to direct the material therefrom first to one set of conveyer flights and then to the opposite set of conveyer flights, substantially as and for the purposes described.

4. In a conveyer, series of semi- or half elliptical flights arranged to convey material in opposite directions, and an intermediate elliptical flight centrally mounted arranged to direct the material to the oppositely conveying flights, substantially as and for the purposes described.

5. A flight elliptical in form centrally mounted upon a shaft and arranged obliquely to feed material first in one direction and then in the opposite direction, substantially as and for the purposes described.

6. A flight, formed practically of two half ellipses set upon a shaft with the same direction of obliquity and in such proximity to each other as to divide or split material and feed it in the rotation of the flight first in one direction and then in the opposite direction, substantially as and for the purposes described.

7. In combination with a feed spout or hopper, a flight set obliquely to its axis of rotation and centrally mounted upon a shaft in such relation to the hopper as to equally divide material fed therefrom and feed the material first in one direction and then in the opposite direction in the rotation of the flight, substantially as and for the purposes described.

In testimony whereof I affix my signature in presence of two witnesses.

FAUSTIN PRINZ.

Witnesses:
JNO. H. MANSCHOT,
GEO. E. MANSCHOT.